C. F. NICKERSON.
PULLEY ADAPTER.
APPLICATION FILED SEPT. 14, 1918.
1,371,512.
Patented Mar. 15, 1921.
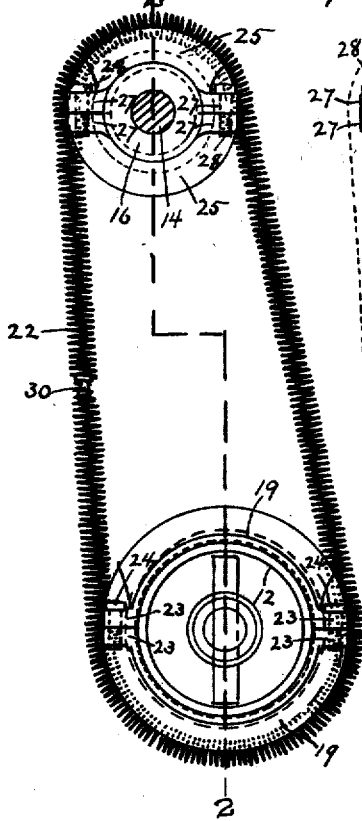
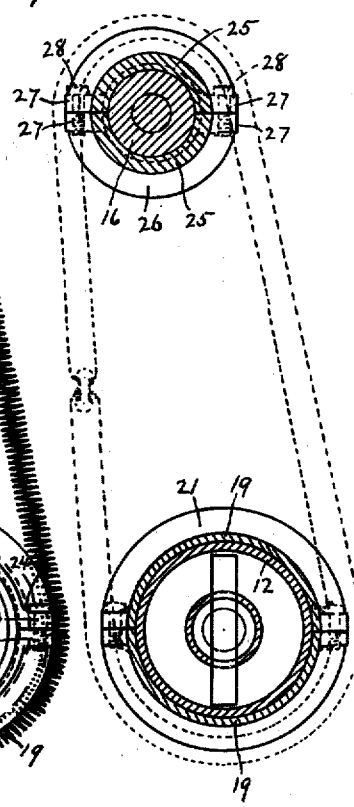
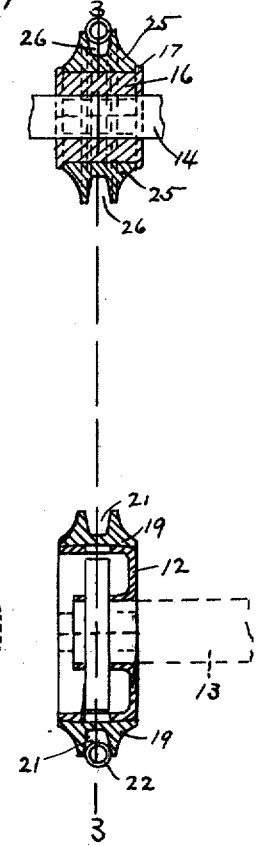
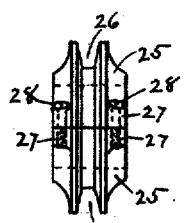
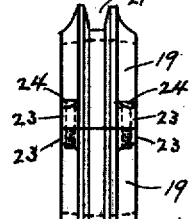
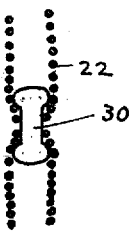
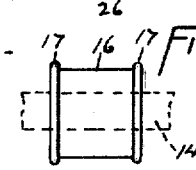
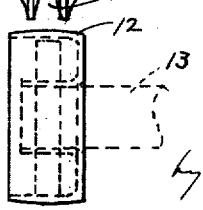
INVENTOR
C. F. Nickerson
by Knight Brown Quimby May
ATTYS.

UNITED STATES PATENT OFFICE.

CHARLES F. NICKERSON, OF READING, MASSACHUSETTS.

PULLEY-ADAPTER.

1,371,512.  Specification of Letters Patent.  Patented Mar. 15, 1921.

Application filed September 14, 1918. Serial No. 254,111.

*To all whom it may concern:*

Be it known that I, CHARLES F. NICKERSON, a citizen of the United States, residing at Reading, in the county of Middlesex and State of Massachusetts, have invented new and useful Improvements in Pulley-Adapters, of which the following is a specification.

The chief object of this invention is to adapt the driving pulley on the main shaft and the driven pulley on the fan shaft of the engine of a Ford automobile, for engagement with and connection by a resilient round belt made from helical wire, so that a resilient round belt may be conveniently substituted for the ordinary flat non-resilient belt with which such engines are customarily provided, without the removal of the usual flat-belt-engaging pulleys.

I attain this object by applying adapters to the said driving and driven pulleys, each adapter constituting an enlargement of the pulley to which it is applied, and being formed externally to engage a helical wire belt and provided with means whereby it may be securely clamped upon the pulley, no change or modification of the latter being required.

Of the accompanying drawings, forming part of this specification:

Figure 1 shows in end elevation the fan shaft pulley and the main shaft or driving pulley of a Ford engine equipped with adapters embodying the invention, and a helical wire belt engaged with said adapters.

Fig. 2 is a section on line 2—2 of Fig. 1.

Fig. 3 is a section on line 3—3 of Fig. 2.

Fig. 4 is a side elevation of the fan shaft pulley without its adapter.

Fig. 5 is a side view of the main shaft pulley without its adapter.

Fig. 6 is a side view of the fan shaft pulley adapter.

Fig. 7 is a side view of the main shaft pulley adapter.

Fig. 8 is a sectional view of a portion of the helical wire belt.

The same reference characters indicate the same parts in all of the figures.

In the drawings 12 represents the driving pulley, usually attached to the main shaft 13 of a Ford engine, said pulley being formed to engage a flat leather belt, and its periphery being somewhat convex or crowned, as shown by Figs. 2 and 5.

14 represents the fan shaft, which is parallel with the main shaft 13, and is provided with the usual flat-belt-engaging pulley 16, having end flanges 17. The pulleys 12 and 16 are arranged in the same vertical plane, so that a transversely flat leather belt is adapted to run upon the pulleys and communicate motion from the driving pulley 12 to the driven pulley 16.

In carrying out my invention, I apply to each of said pulleys an adapter composed of two arcuate sections, provided with means whereby they may be confined upon the pulley, said sections collectively forming an annulus, shaped internally to conform to the exterior of the pulley, and externally to engage a round belt.

19, 19 represent the sections of the adapter applied to the driving pulley 12. Each section 19 has a semi-circular internal face, which is transversely concave and conforms closely to a portion of the crowned exterior of the pulley 12, to prevent lateral displacement of the adapter when it is clamped as hereinafter described on the pulley. The external face of each section 19, is provided with a groove 21, formed to engage a helical wire belt 22. The sections 19 are provided with coupling means, whereby they may be securely clamped on the pulley, said means being embodied in ears 23, formed on the ends of the sections, at opposite sides of the grooves 21 and threaded bolts 24 inserted in coinciding orifices in said ears, the orifices in ears of one section being screw-threaded to engage the bolt-threads.

25, 25 represent the sections of the adapter applied to the driven pulley 16. Each of said sections has a semi-circular inner face conforming closely to the periphery of the pulley 16, between the flanges 17 thereof, as shown by Fig. 2, said flanges preventing lateral displacement of the adapter. The sections 25 are provided with belt-engaging grooves 26, and with ears 27 and bolts 28, whereby the sections may be clamped upon the pulley 16.

It will now be seen that the described adapters constitute enlargements of the pulleys to which they are applied, and enable said pulleys to be connected by a helical wire belt, the relative proportions of the pulleys being the same as before.

The application of the adapters to the pulleys does not require any change or modification of the latter, so that the owner of a Ford car may substitute a resilient round belt for the usual non-resilient flat leather belt by simply applying the adapters to the pulleys and applying the round belt to the adapters.

The belt 22 can be made of a single length of helically coiled wire, the ends of which are coupled together by a dumb-bell shaped member 30, upon the enlarged ends of which the end convolutions of the wire are closed or contracted, as shown by Fig. 8. The contracted convolutions are free to turn or slip on the enlarged ends of the coupling member.

A belt, composed of a length of helically-coiled wire and a dumb-bell-shaped coupling member engaged with contracted convolutions of the belt, will form the subject of a separate application for Letters Patent to be filed by me.

I claim:

1. A round-belt-engaging pulley adapter comprising a pair of arcuate sections, each formed as a single piece, and having a semicircular internal face conforming to one half of the periphery of a flat-belt-engaging pulley, and a semi-circular external groove opening at its ends on the ends of the section and formed to engage a round belt, said sections being provided with coupling means external to the grooves therein, whereby the sections may be clamped upon a pulley to form a continuous two part annulus having a continuous external groove.

2. A round-belt-engaging pulley adapter comprising a pair of arcuate sections each formed as a single piece, and having a semi-circular internal face conforming to one half of the periphery of a flat-belt-engaging pulley, a semi-circular external groove opening at its ends on the ends of the section, and formed to engage a round belt, apertured ears on the section-ends at opposite sides of the groove-ends, and bolts engaged with said ears to clamp the two sections on a pulley and maintain the grooves in registration with each other, so that the assembled sections form a continuous externally grooved two part annulus.

3. A pulley adapter substantially as specified by claim 1, the internal faces of said sections being concave and conforming to the convex or crowned periphery of a driving pulley to prevent lateral displacement of the annulus formed by the sections.

In testimony whereof I have affixed my signature.

CHARLES F. NICKERSON.